United States Patent
Dreer et al.

(10) Patent No.: US 10,448,574 B2
(45) Date of Patent: Oct. 22, 2019

(54) COMPRESSION ROLL HOUSING

(71) Applicant: AGCO International GmbH, Hesston, KS (US)

(72) Inventors: Constantin Dreer, Illertissen (DE); Johannes Haehnel, Zwickau (DE)

(73) Assignee: AGCO International GmbH, Neuhausen (CH)

( * ) Notice: Subject to any disclaimer, the term of this patent is extended or adjusted under 35 U.S.C. 154(b) by 309 days.

(21) Appl. No.: 15/447,616

(22) Filed: Mar. 2, 2017

(65) Prior Publication Data

US 2017/0251604 A1    Sep. 7, 2017

(30) Foreign Application Priority Data

Mar. 3, 2016 (GB) .................................. 1603728.5

(51) Int. Cl.
   *B30B 3/04* (2006.01)
   *A01D 75/00* (2006.01)
   *A01D 43/10* (2006.01)

(52) U.S. Cl.
   CPC .............. *A01D 75/00* (2013.01); *A01D 43/10* (2013.01); *B30B 3/04* (2013.01)

(58) Field of Classification Search
   CPC . B30B 3/04; A01F 29/06; A01F 29/10; A01D 45/10; A01D 43/10; A01D 67/00; A01D 61/006; A01D 75/00
   See application file for complete search history.

(56) References Cited

U.S. PATENT DOCUMENTS

| | | | | |
|---|---|---|---|---|
| 4,694,747 A | * | 9/1987 | Marozzi | B41K 3/56 101/301 |
| 5,014,579 A | * | 5/1991 | Galonska | B23D 21/00 493/288 |
| 2001/0037638 A1 | | 11/2001 | Krone | |
| 2012/0132090 A1 | * | 5/2012 | Pourchet | A01F 15/07 100/88 |

FOREIGN PATENT DOCUMENTS

| | | |
|---|---|---|
| CN | 102224780 A | 10/2011 |
| EP | 0541975 A1 | 5/1993 |
| GB | 2323512 A | 9/1998 |
| GB | 2474291 A | 4/2011 |
| WO | 2011/042803 A | 4/2011 |

OTHER PUBLICATIONS

UK Intellectual Property Office, International Search Report for UK Priority Application No. 1603728.5, dated Sep. 2, 2016.
European Patent Office, International Search Report for related EP Application No. EP17158700, dated Jun. 8, 2017.

* cited by examiner

*Primary Examiner* — Jimmy T Nguyen

(57) ABSTRACT

A compression roll housing for an agricultural machine, having a side panel provided with at least one elongated aperture for receiving a shaft of a compression roll and allowing movement of the shaft within the aperture. The housing is provided with a cover plate which rotates about an axis parallel to the shaft and is provided with an indentation to partially surround the shaft. Movement of the shaft, such as along a longitudinal axis of the aperture, causes the plate to rotate to provide a cover across the aperture to prevent the escape of any material from the housing.

6 Claims, 4 Drawing Sheets

COMPRESSION ROLL HOUSING

BACKGROUND

Field of Invention

This invention relates to a roll housing on an agricultural machine. More specifically, it relates to a compression roll housing on a harvesting machine, for example, a forage harvester.

Description of Related Art

A forage harvester has a front attachment which includes a front cutter and a mechanism for feeding the cut crop to compression rolls where it is compressed. The compressed crop is then cut by cutters before being fed into a discharge chute.

The compression rolls which comprise a drum and a shaft are contained within a compression roll housing. Typically, three sets of rollers are arranged in pairs, each set having an upper and lower roller so that the crop is fed and compressed between each set. The housing comprises apertures so that the rolls can be mounted within the housing with the shafts protruding through the apertures. The rollers must be mounted so that the distance between the upper and lower rolls can be altered in order to facilitate cleaning and repairs and to allow the compression thickness to be altered. Typically, the shafts of the upper set of rollers are mounted within longitudinal apertures which extend generally vertically on the sides of the housing. This means that when the shaft is secured at a desired height within an aperture, there is at least one portion of the aperture which is not filled by the shaft though which harvested material in the housing may escape which in turn reduces the yield of compressed, cut crop and can cause damage/blocking to other parts of the machine. The movements of the upper rolls are achieved through the crop material which flows through them.

EP 0541 975 B1 discloses the use of sliders to seal, or cover roll housing apertures. The sliders are mounted within guides provided on the housing and are pivotally connected so that the sliders are vertically moveable over the aperture when there is movement of the shaft within the aperture.

Such sliders tend to cant which restricts movement. EP 0 541 975 B1 tries to overcome this problem by fitting the sliders into guides to avoid canting. Even if canting during movement is avoided by reducing the slackness between the guides and sliders, the uncovered guides are likely to be soiled by dust or crop from the housing which may restrict movement of the sliders. Further, when the slider is in an upper position a part of the aperture below is not covered by the slider because the length of the slider is limited due to the proximity of the shaft of a lower roll.

BRIEF SUMMARY OF THE INVENTION

According to the invention there is provided a compression roll housing for an agricultural machine, said housing having a side panel provided with at least one elongated aperture for receiving a shaft of a compression roll, said aperture allowing movement of the shaft within the aperture, wherein the housing is provided with a cover plate which rotates about an axis parallel to the shaft and said plate is provided with an indentation to partially surround the shaft and wherein movement of the shaft within the aperture causes the plate to rotate to provide a cover across the aperture to prevent the escape of material from the housing.

The invention provides an alternative means for covering a roll housing aperture to prevent crop material escaping from the housing whilst permitting movement of the roll shaft within the aperture.

Suitably, the aperture allows movement of the shaft within the aperture along a longitudinal axis of the aperture.

The cover plate rotates when the shaft moves vertically within the elongated aperture so that a part of the elongated aperture both above and below the shaft is always covered by the plate to prevent the loss of any crop material.

Preferably, the plate has the form of a sector of a circle. More preferably, the cover plate is positioned on the side panel inside of the housing.

BRIEF DESCRIPTION OF THE DRAWINGS

The invention will now be described, by example only, with reference to the accompanying drawings in which.

DETAILED DESCRIPTION OF INVENTION

Figure 1:
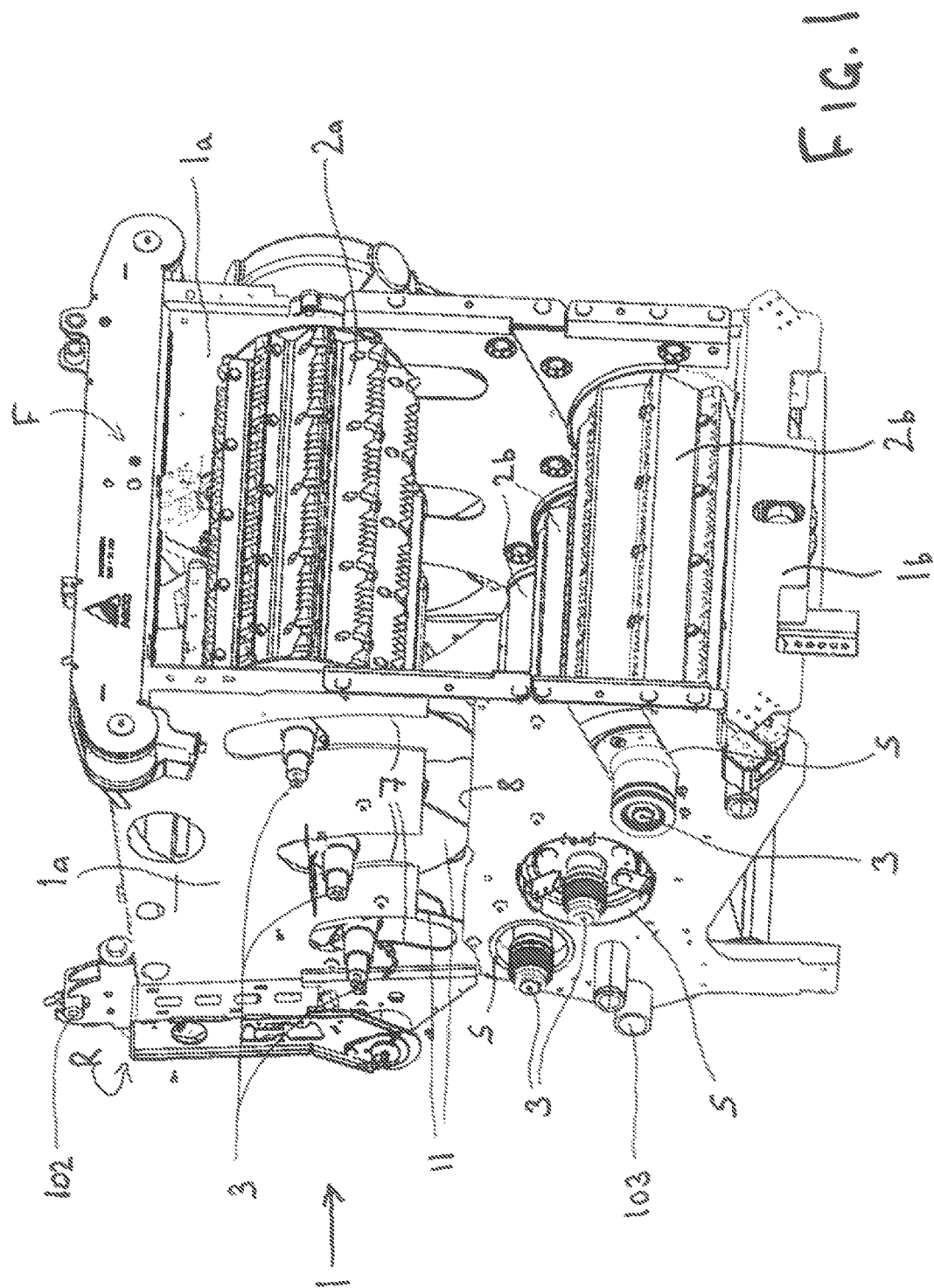
FIG. 1 which is a perspective view of a compression roll housing in accordance with the invention.

In the figures is shown a housing 1 as looking into the housing from the front of the housing towards the rear. The housing 1 is attached to the forage harvester (not shown) by upper and lower links (102,103). A front attachment (not shown) is attached to the front of the housing which comprises a front cutter for cutting the crop from the stem and a mechanism for feeding the cut crop to the compression roll housing 1. The rear of the housing is attached to a part of machine which houses a knife drum. Once the crop has been compressed in the compression roll housing it is fed to the knife drum where it is cut into predetermined crop elements.

The housing 1 comprises two opposing side panels 1a and an upper and lower panel 1b. The front end F of the housing 1 is open and connected to a front attachment so that harvested material can be fed from the cutter into the compression roll housing. The rear end R of the housing is open for attachment to a further part of the machine where the compressed crop is cut. The housing 1 houses three pairs of compression rolls. Each pair has an upper roll 2a and a lower roll 2b. Each of the compression rolls 2a, 2b comprises a respective drum mounted on a shaft 3.

Each of the side panels 1a has three elongated apertures 7 for receiving the shafts 3 of the upper rolls 2a and three, rounded apertures 5 for receiving the shafts 3 and drum of the lower rolls 2b. The elongated apertures 7 are substantially vertical and gently curved. Each of the side panels 1a of the housing is also provided with a horizontal aperture 8 which extends across the housing 1 under the elongated apertures 7. The horizontal apertures 8 enable the upper rolls 2a to be assembled through the front end of the housing.

The elongated apertures 7 allow the shafts 3 of each of the upper rolls 2a to be raised or lowered within the housing to alter the size of the gap between the upper and lower rolls 2a, 2b. The elongated apertures 7 mean that crop can escape from within the housing 1.

Figure 2:
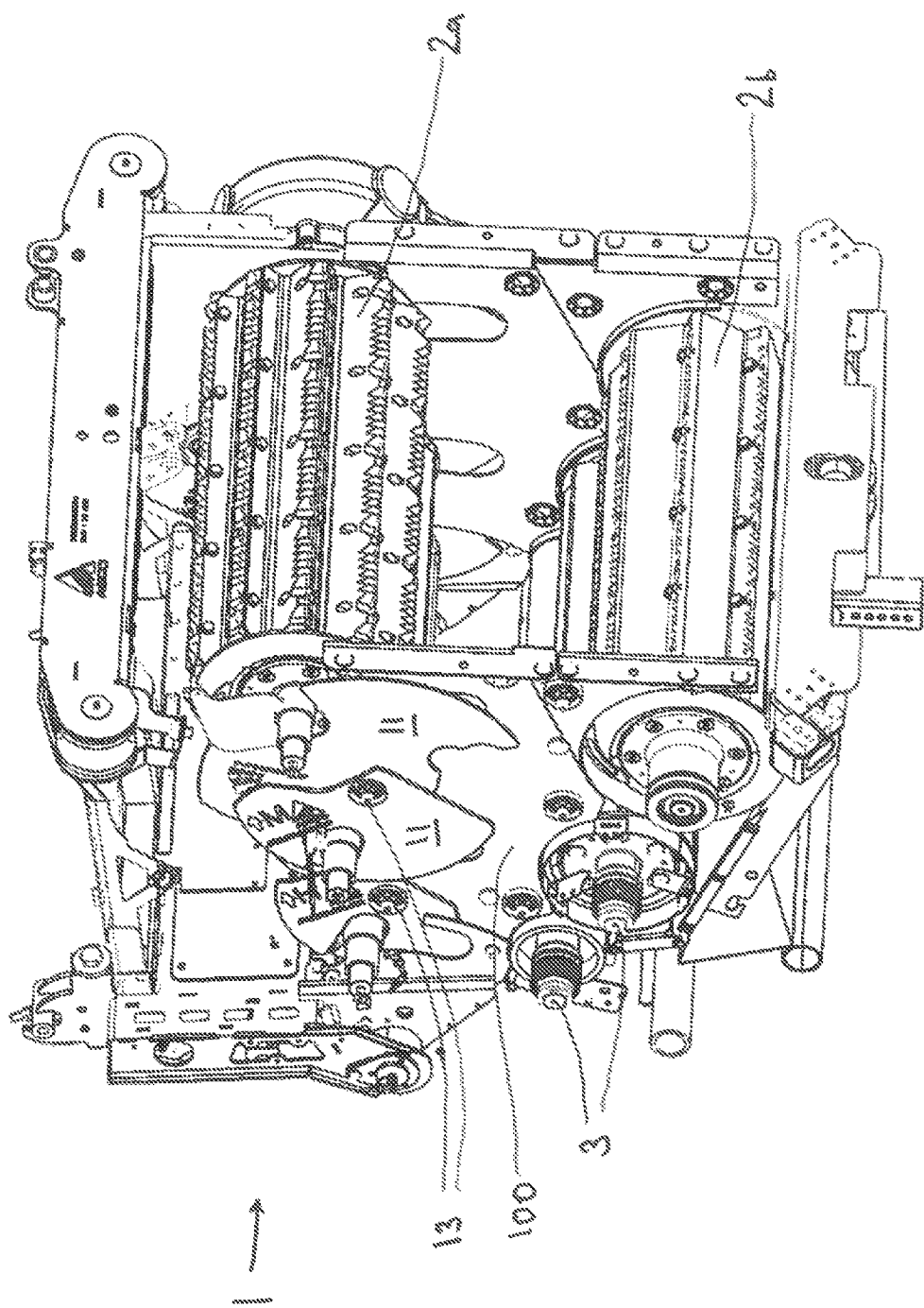
FIG. 2 is a perspective view of a compression roll housing with side panels removed.

In an embodiment of the invention, better shown in FIG. 2 the housing 1 is provided with cover plates 11 on each side which are pivotably attached at pivot points 13 to a protection plate 100 so that they may rotate about an axis which is parallel to the longitudinal axis of the shafts 3. Each end of each shaft 3 of upper rolls 2a is provided with a cover plate 11 on the outside of the protection plate 100. In an alternative arrangement, the cover plates 11 could be arranged on the outside of the housing. Each cover plate 11 has the form of a sector of a circle having an arc and two straight or substantially straight edges. Each plate is further provided with a partial indentation 12 in its arc. The indentation is slightly wider than the diameter of shafts 3 so that the indentation partially surrounds the shaft 3. As the shaft 3 of an upper roll 2a slides vertically within an elongated aperture 7, so the shaft 3 exerts a force on indentation 12 causing the cover plate 11 to rotate clockwise or anti clockwise about its pivot point 13. The cover plates 11 are made of a plastics material and so are lightweight and therefore rotate easily. By rotating, the cover plate 11 moves to cover the exposed part of the elongated aperture where the shaft 3 was and thus prevents crop escaping through the elongated aperture.

Figure 3A:
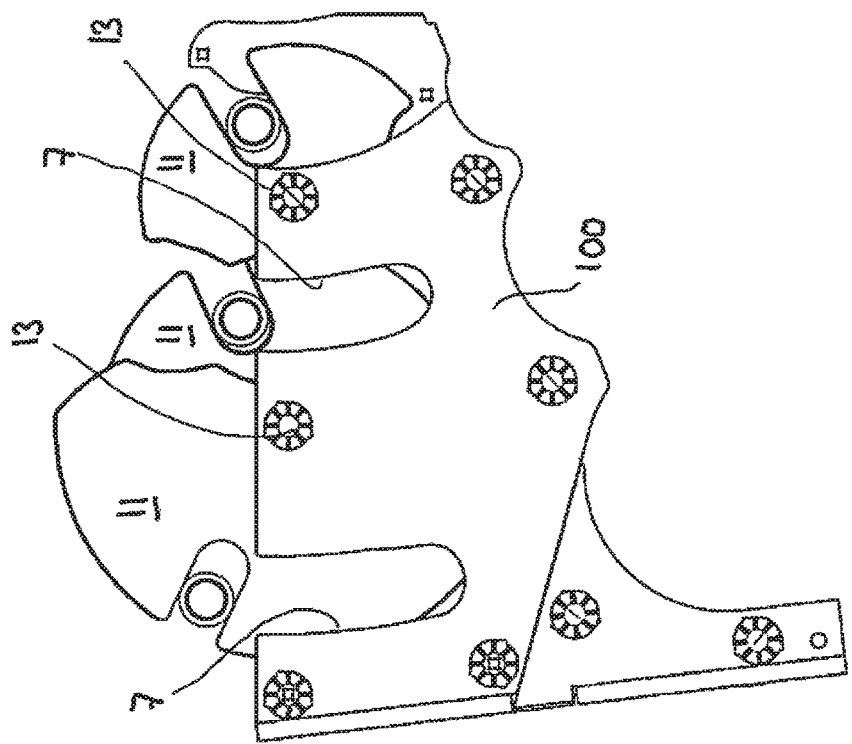
FIGS. 3a and 3b are enlarged back views of the covering plates in different position.
Figure 3B:
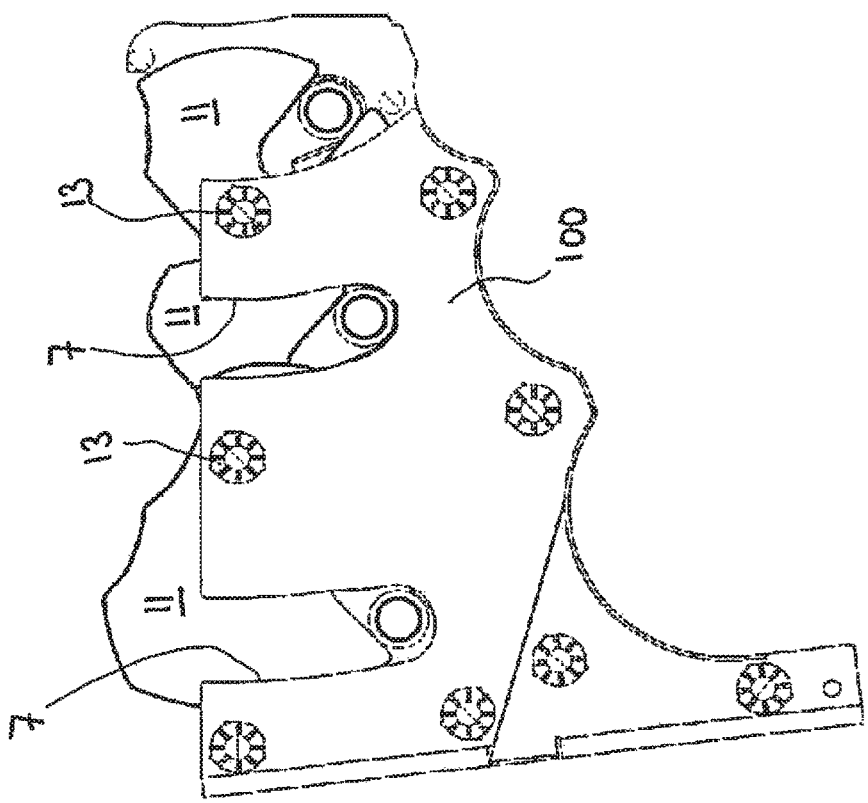

In FIGS. 3a and 3b is shown that also the protection plate 100 is provided with an elongated aperture 7 for receiving the shaft 3. It can be seen that also the elongated aperture 7 from the protection plate 100 will be covered during raising (FIG. 3b) and lowering (FIG. 3a) of the shaft 3 by the cover plate 11.

Figure 4B:
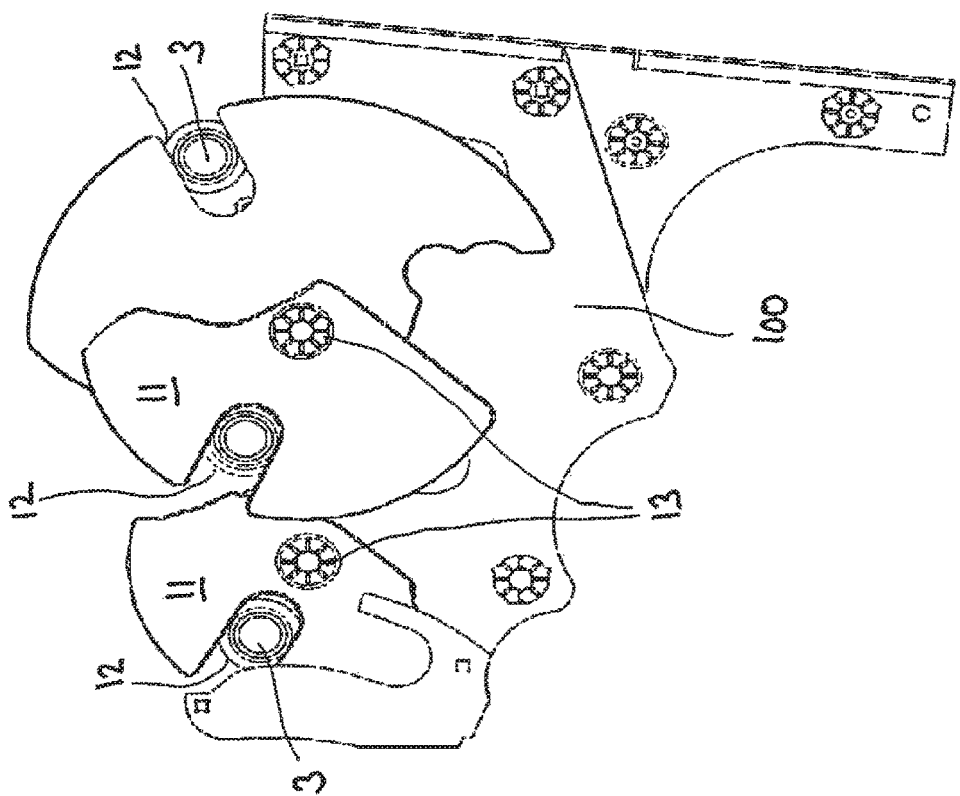
FIGS. 4a and 4b are enlarged front views of the covering plates in different position.
Figure 4A:
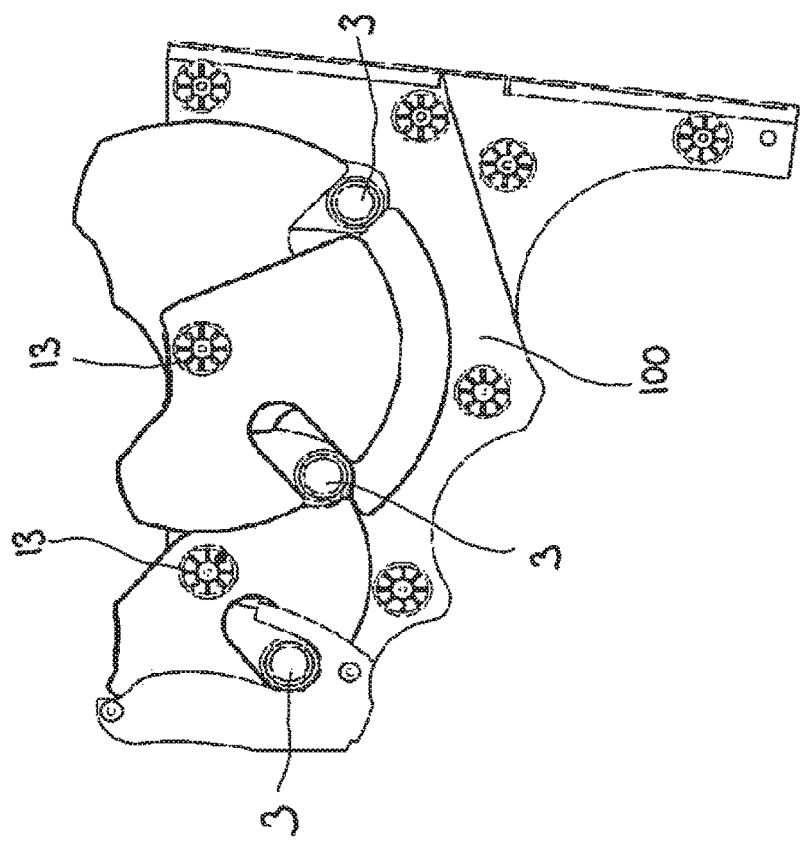

In FIGS. 4a and 4b is shown the front view of the protection plate 100 and the cover plate 11 in different positions. The cover plate 11 has the advantage that it moves when the shaft 3 moves so that a part of the elongated aperture (from the side panel and protection plate) both above and below the shaft is always covered by the plate 11. Depending on the radius of the sector of the cover plates 11, the cover plates can provide a cover over the length of the elongated aperture 7 regardless of the position of the shaft 3 within the elongated aperture 7.

In the foregoing, there is described a compression roll housing for an agricultural machine, said housing having a side panel provided with at least one elongated aperture for receiving a shaft of a compression roll, said aperture allowing movement of the shaft within the aperture. The housing is provided with a cover plate which rotates about an axis parallel to the shaft and said plate is provided with an indentation to partially surround the shaft. Movement of the shaft, such as along a longitudinal axis of the aperture, causes the plate to rotate to provide a cover across the aperture to prevent the escape of any material from the housing.

The invention claimed is:

1. A compression roll housing for an agricultural machine, said housing having a side panel provided with at least one elongated aperture for receiving a shaft of a compression roll, said aperture allowing movement of the shaft along the elongated aperture, wherein the housing is provided with a cover plate which rotates about an axis parallel to the shaft, and said plate is provided with an elongated indentation to partially surround the shaft, and wherein movement of the shaft along the elongated aperture causes movement of the shaft along the elongated indentation thereby causing the plate to rotate to provide a cover across the elongated aperture to prevent the escape of material from the housing.

2. The compression roll housing as claimed in claim 1 wherein the aperture allows movement of the shaft along a longitudinal axis of the aperture, which movement causes the plate to rotate to provide a cover across the aperture in all positions of the shaft within the aperture.

3. The compression roll housing as claimed in claim 1 wherein the plate has the form of a sector of a circle.

4. The compression roll housing as claimed in claim 1 wherein the cover plate is positioned on the side panel inside of the housing.

5. The compression roll housing as claimed in claim 2 wherein the plate has the form of a sector of a circle.

6. The compression roll housing as claimed in claim 3 wherein the cover plate is positioned on the side panel inside of the housing.

* * * * *